US010113677B2

(12) United States Patent
Bourget et al.

(10) Patent No.: US 10,113,677 B2
(45) Date of Patent: Oct. 30, 2018

(54) CONNECTING ENDPIECE OF A FLEXIBLE PIPE WITH A SPACING MEMBER, ASSOCIATED FLEXIBLE PIPE AND METHOD

(71) Applicant: TECHNIP FRANCE, Courbevoie (FR)

(72) Inventors: Jean-Christophe Bourget, Bois Guillaume (FR); German Raul Bruno, Rouen (FR); Anh Tuan Do, Cormeilles en Parisis (FR); Fernando Leitao Gonçalves Toste, Rio de Janeiro (BR); Jean-François Langui, Vila Velha (BR); Felipe Reis, Rio de Janeiro (BR); Guillaume Chaudet, Malaunay (FR); Yves Castel, La Vaupaliere (FR); Joël Le Nouveau, Le Vaudreuil (FR); Eric Buon, Mont Saint Aignan (FR); Carlos Ronaldo Andrade Dos Reis, Rio de Janeiro (BR)

(73) Assignee: TECHNIP FRANCE (FR)

( * ) Notice: Subject to any disclaimer, the term of this patent is extended or adjusted under 35 U.S.C. 154(b) by 307 days.

(21) Appl. No.: 14/902,305

(22) PCT Filed: Jul. 1, 2014

(86) PCT No.: PCT/EP2014/063997
§ 371 (c)(1),
(2) Date: Dec. 30, 2015

(87) PCT Pub. No.: WO2015/000923
PCT Pub. Date: Jan. 8, 2015

(65) Prior Publication Data
US 2016/0334039 A1    Nov. 17, 2016

(30) Foreign Application Priority Data

Jul. 3, 2013 (FR) ..................................... 13 56510

(51) Int. Cl.
*F16L 31/00* (2006.01)
*F16L 33/01* (2006.01)
*F16L 33/18* (2006.01)

(52) U.S. Cl.
CPC ............... *F16L 33/01* (2013.01); *F16L 33/18* (2013.01)

(58) Field of Classification Search
CPC ............ F16L 33/01; F16L 33/18; F16L 33/28
(Continued)

(56) References Cited

U.S. PATENT DOCUMENTS 3,874,064 A * 4/1975 Chevalier ............. F16L 11/083
29/460
4,033,612 A * 7/1977 Chevalier ............. F16L 11/083
285/222.4
(Continued)

FOREIGN PATENT DOCUMENTS

FR          13 53698       2/1964
JP          H 04-171390    6/1992
(Continued)

OTHER PUBLICATIONS

International Search Report dated Aug. 14, 2014 issued in corresponding International patent application No. PCT/EP2014/063997.

*Primary Examiner* — Aaron M Dunwoody
(74) *Attorney, Agent, or Firm* — Ostrolenk Faber LLP

(57) ABSTRACT

This endpiece includes at least one end segment of each armor element, an end vault and a cover, the end vault and the cover delimiting between them a chamber for receiving the end segment and a material for filling the receiving chamber, in which the end segment is embedded. The endpiece includes a spacing member positioned so as to internally bear upon the end segments of the armor elements of at least one armor layer. This spacing member defining, on at least one end segment of a armor element of said armor (Continued)

layer, contact areas axially spaced apart along said end segment, the contact areas delimiting between intermediate contact spaces between the filling material and the end segment.

17 Claims, 6 Drawing Sheets

(58) Field of Classification Search
USPC .................. 285/290.1–290.4, 222.1–222.5
See application file for complete search history.

(56) References Cited

U.S. PATENT DOCUMENTS

| | | | | |
|---|---|---|---|---|
| 5,061,826 A | * | 10/1991 | MacCulloch | G02B 6/4427 138/109 |
| 5,685,576 A | * | 11/1997 | Wolfe | F16L 23/024 285/148.8 |
| 5,884,383 A | * | 3/1999 | Wolfe | F16L 13/103 29/237 |
| 7,303,213 B2 | * | 12/2007 | Rytter | F16L 33/01 138/109 |
| 2006/0201566 A1 | * | 9/2006 | Brink | F16L 33/01 138/109 |
| 2009/0000683 A1 | | 1/2009 | Sheldrake | |
| 2011/0048567 A1 | * | 3/2011 | Pollack | F16L 33/01 138/129 |
| 2013/0192707 A1 | * | 8/2013 | Graham | E21B 47/0006 138/109 |
| 2014/0216591 A1 | * | 8/2014 | Witz | F16L 59/141 138/129 |
| 2015/0345680 A1 | * | 12/2015 | Espinasse | F16L 33/01 285/45 |
| 2016/0069494 A1 | * | 3/2016 | Paulo | B21C 37/12 285/399 |
| 2016/0208969 A1 | * | 7/2016 | Bertoni | F16L 33/01 |
| 2016/0319972 A1 | * | 11/2016 | Dehais | B25B 27/10 |

FOREIGN PATENT DOCUMENTS

| | | |
|---|---|---|
| WO | WO 99/49259 | 9/1999 |
| WO | WO 00/66927 | 11/2000 |
| WO | WO 02/095281 | 11/2002 |
| WO | WO 2007/144553 A1 | 12/2007 |
| WO | WO 2013/074098 A1 | 5/2013 |

* cited by examiner

CONNECTING ENDPIECE OF A FLEXIBLE PIPE WITH A SPACING MEMBER, ASSOCIATED FLEXIBLE PIPE AND METHOD

CROSS REFERENCE TO RELATED APPLICATIONS

The present application is a 35 U.S.C. § 371 National Phase conversion of PCT/EP2014/063997, filed Jul. 1, 2014, which claims benefit of French Application No. 13 56510, filed Jul. 3, 2013, the disclosure of which is incorporated herein by reference. The PCT International Application was published in the French language.

TECHNICAL FIELD OF THE INVENTION

The present invention relates to a connection endpiece of a flexible pipe for conveying fluid, the flexible pipe comprising at least one tubular sheath and at least one layer of tensile armors positioned externally relatively to the tubular sheath, the layer of armors comprising a plurality of wire-shaped armor elements, the endpiece including:
  at least one end segment of each armor element,
  an end vault and a cover attached on the end vault, the end vault and the cover delimiting together a chamber for receiving the end segment,
  a material for filling the receiving chamber, in which is embedded the end segment.

The pipe is in particular a flexible pipe of the unbonded type intended for conveying hydrocarbons through an extent of water, such as an ocean, a sea, a lake or a river.

BACKGROUND OF THE INVENTION

Such a flexible armor is for example produced according to the normative documents API 17J (Specification for Unbonded Flexible Pipe) and API RP 17B (Recommended Practice for Flexible Pipe) established by the American Petroleum Institute.

The pipe is generally formed with a set of concentric and superposed layers. It is considered as «unbounded» in the sense of the present invention and from the moment that at least one of the layers of the pipe is able to move longitudinally relatively to the adjacent layers during flexure of the pipe. In particular, an unbonded pipe is a pipe without any binding materials connecting layers forming the pipe.

The pipe is generally positioned through an extent of water, between a bottom assembly, intended to collect the exploited fluid in the bottom of the extent of water and a floating or fixed surface assembly, intended to collect and distribute the fluid. The surface assembly may be a semi-submersible platform, a FPSO or another floating assembly.

In certain cases, for exploiting fluids in deep waters, the flexible pipe has a length of more than 800 m. The ends of the pipe have endpieces for connecting to the bottom assembly and to the surface assembly, as well as for the intermediate connections.

These pipes are subject to very strong forces in axial traction, notably when the extent of water in which is positioned the pipe is very deep.

In this case, the upper endpiece connecting the pipe to the surface assembly should absorb a very large axial tension, which may attain several hundred tons. These forces are transmitted to the endpiece via the tensile armor layers extending along the pipe.

The axial tension not only has a high average value, but also permanent variations depending on the vertical movements of the surface assembly and of the pipe, under the effect of agitation of the extent of water caused by the swell or by waves.

The variations of axial tension may attain several tens of tons and be continually repeated during the service time of the pipe. Within 20 years, the number of cycles may thus attain more than 20 million.

Therefore it is necessary to ensure a particularly robust attachment between the tensile armor layers and the body of the endpiece.

For this purpose, in known end pieces, the anchoring of the armors is generally ensured by friction between the armor wires and the epoxy resin cast into the chamber delimited by the vault and the cover.

Moreover, the capstan effect related to the helical trajectory of the armor wires also contributes to anchoring of the armors, this effect may be increased by modifying the diameter of the helix described by the wires in the endpiece relatively to the diameter of this helix in current length, for example by gradually increasing this diameter following an ascending cone, and then by reducing it along a descending cone.

Further, deformations with the shape of a hook, or of a wave or of a twist may be formed at the end of each armor wire so as to be engaged into the epoxy resin, in order to produce mechanical blocking opposing the applied tension. These deformations initiate the force required for setting the capstan effect into place.

Such an endpiece does not give entire satisfaction. Sometimes, over time, the anchoring of the tensile armors becomes faulty by fatigue.

The failure may occur in the rear portion, at the area of detachment of the armors relatively to the diameter of the current length, this portion being further weakened during the mounting because of folding and unfolding the armors, required for setting into place the endpiece.

In order to overcome this problem, WO 2013/074098 describes a flexible pipe endpiece, in which the crimping of the internal sheath is carried out from the front, in order to avoid deformation of the armor elements which consist here in a composite material.

The end segments of the armor elements adopt a divergent conformation from the rear to the front during the setting into place of the endpiece, and retain this conformation in the endpiece.

Such an endpiece does not give entire satisfaction. Indeed, the conformation of the end segments places them in contact with each other in the chamber for receiving the resin.

The contact surface between each end segment and the resin is therefore reduced relatively to a more traditional structural endpiece, which reduces the fatigue strength of the endpiece, or which requires a considerable elongation of the endpiece for maintaining its absorption of axial tension.

SUMMARY OF THE INVENTION

An object of the invention is to obtain an endpiece of a flexible pipe having efficient absorption of axial tension, wherein the risk of a failure in fatigue, notably in the end segments of the armors is strongly decreased, without however significantly elongating the length of the endpiece.

For this purpose, the subject matter of the invention is an endpiece of the aforementioned type, characterized in that the endpiece includes at least a spacing member positioned so as to internally bear upon the end segments of the armor elements of at least one layer of armors, said or each spacing member defining, on at least one end segment of a armor element of said layer of armors, contact areas axially spaced apart along said end segment, the contact areas delimiting between them intermediate contact spaces between the filling material and the end segment.

The endpiece according to the invention may comprise one or several of the following features, taken individually or according to any technically possible combination:
- it includes, for at least one layer of armors, a plurality of disconnected spacing members, axially spaced apart from each other, each spacing member having a contact area on at least one end segment of a armor element of said layer of armors;
- it includes, for at least one layer of armors, a spacing member wound inside the layer of armors, defining turns axially spaced apart from each other, each turn having a contact area on at least one end segment of a armor element of the layer of armors;
- it includes at least one interior armor layer, and at least one outer armor layer, at least one spacing member being positioned between the end segments of the armor elements of the inner armor layer and the end segments of the armor elements of the outer armor layer by defining, on each end segment of the contact areas axially spaced apart along the end segment, the contact areas delimiting between them intermediate contact spaces between the filling material and each armor element;
- the radial thickness of a spacing member taken facing a front contact area of the spacing member with an end segment of a armor element of at least one armor layer is different, and is advantageously greater than the radial thickness of a spacing member, taken facing a rear contact area of the spacing member with the same end segment;
- it includes at least one front spacing member defining the front contact area and at least one rear spacing member disconnected of the front spacing member, the rear spacing member delimiting the rear contact area, the maximum radial thickness of the front spacing member being different, advantageously greater than, the maximum radial thickness of the rear spacing member;
- the end segments of the armor elements of at least one armor layer are spaced apart laterally from each other and define between them circumferential contact interstices between the filling material and the armor element;
- the circumferential interstices and the intermediate spaces communicate between them so as to define, on each end segment, at least one peripheral contact region in which the filling material is in contact with the end segment over the whole perimeter of the end segment;
- each end segment of the armor elements of at least one armor layer extends in a divergent way away from a longitudinal axis of the endpiece, from a rear detachment point to a free front end;
- it includes at least one inner armor layer, and at least one outer armor layer, the opening angle of the end segments of the armor elements of the outer armor layer being greater than the opening angle of the end segments of the armor elements of the inner armor layer, said or each spacing member being positioned in contact between the end segments of the armor elements of the inner armor layer and the end segments of the armor elements of the outer armor layer;
- each end segment of the armor elements of at least one armor layer includes a rear region extending in a divergent way away from a longitudinal axis from the endpiece, from a rear detachment point, and a front region extending in a convergent way towards the longitudinal axis of the endpiece from the rear region as far as a free front end;
- the armor elements are at least partly made from a composite material;
- it includes at least one external collar radially surrounding the end segments of the outmost armor layer, the external collar preventing contact between the cover and the end segments of the outmost armor layer.

The subject-matter of the invention is also a flexible pipe for conveying fluid, characterized in that it includes:
- a tubular sheath;
- at least one tensile armor layer externally positioned relatively to the tubular sheath, the tensile armor layer comprising a plurality of wire-shaped armor elements,
- an endpiece as defined above, mounted at the end of the tubular sheath.

The subject-matter of the invention is also a method for mounting an endpiece of a flexible pipe, comprising the following steps:
- providing a tubular sheath;
- placing at least one tensile armor layer outside the tubular sheath, the tensile armor layer comprising a plurality of wire-shaped armor elements, each armor element comprising an end segment;
- setting into place an end vault and a cover attached on the end vault, the end vault and the cover delimiting between them a chamber for receiving the end segment;
- introducing a filling material into the receiving chamber in order to embed the end segment;
- characterized in that it includes, before introducing the filling material, the setting into place of at least one spacing member positioned so as to internally bear upon the end segments of the armor elements of at least one armor layer, said or each spacing member defining, on at least one end segment of a armor element of said armor layer, contact areas axially spaced out along said end segment, the contact areas delimiting between them intermediate contact spaces between the filling material and the end segment, after introducing the filling material.

BRIEF DESCRIPTION OF THE DRAWINGS

The method according to the invention may comprise one or several of the following features, taken individually or according to any technically possible combination:
- the end segments of the armor elements of at least one armor layer are released so as to adopt a rest conformation before setting into place the spacing member.

DESCRIPTION OF PREFERRED EMBODIMENTS

In all the following, the terms of «outer» and «inner» generally mean in a radial way with respect to the axis A-A' of the pipe, the term «outer» meaning that it is relatively more distant radially from the axis A-A' et the term «inner» meaning as relatively radially closer to the axis A-A' of the pipe.

The terms of «front» and «rear» are meant axially with respect to an axis A-A' of the pipe, the term «front» meaning as relatively more distant from the middle of the pipe and closer to one of its ends, the term «rear» meaning as relatively closer to the middle of the pipe and further distant from one of its ends. The middle of the pipe is the point of the pipe located at equal distances from both ends of the latter.

Figure 1:
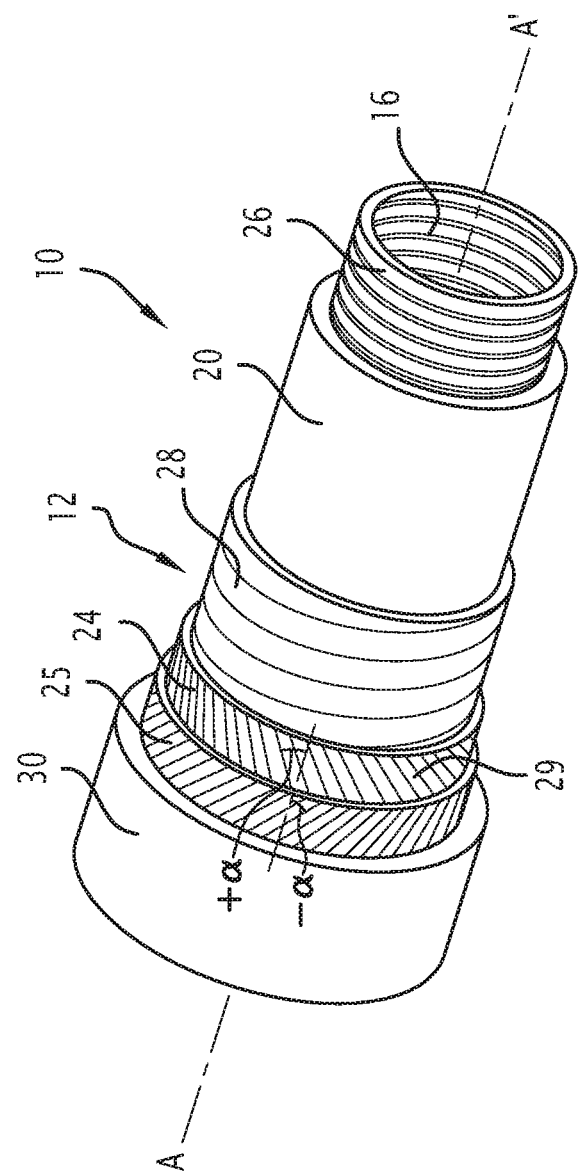
FIG. 1 is a partly cutaway perspective view of a central segment of a first flexible pipe according to the invention.

A first flexible pipe 10 according to the invention is partly illustrated by FIG. 1.

Figure 2:
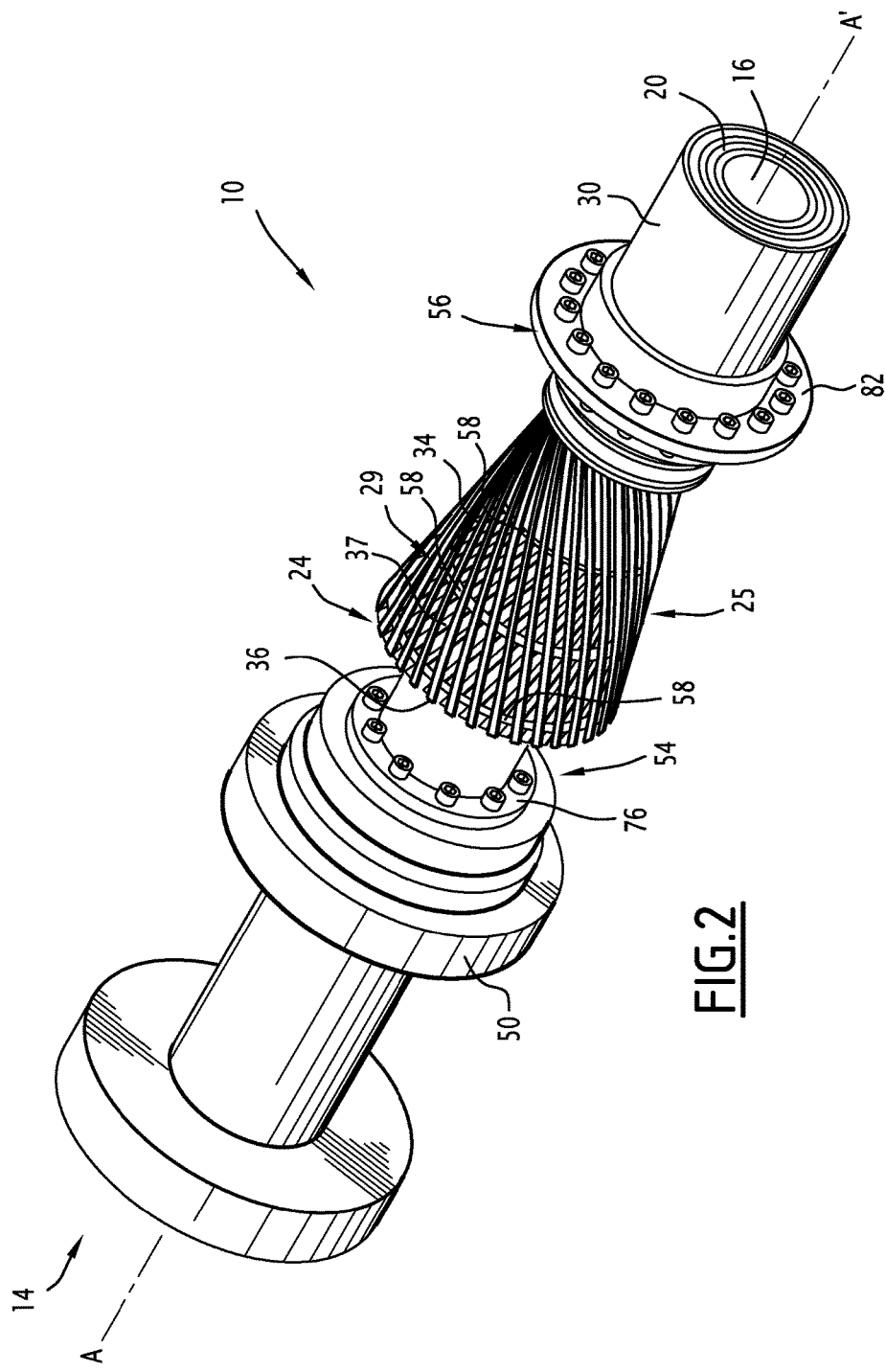
FIG. 2 is a similar view to FIG. 1 of an endpiece of the pipe of FIG. 1.

The flexible pipe 10 includes a central segment 12 partly illustrated in FIG. 1. It includes, at each of the axial ends of the central segment 12, an end endpiece 14 (not visible in FIG. 1), the relevant portions of which are illustrated in FIG. 2.

With reference to FIG. 1, the pipe 10 delimits a central passage 16 for circulation of a fluid, advantageously a petroleum fluid. The central passage 16 extends along an axis A-A' between the upstream end and the downstream end of the pipe 10. It opens through the endpieces 14.

The flexible pipe 10 is intended to be positioned through an extent of water (not shown) in a facility for exploiting fluid, notably hydrocarbons.

The extent of water is for example a sea, a lake or an ocean. The depth of the extent of water at right angles to the fluid exploitation facility is for example comprised between 500 m and 3,000 m.

The fluid exploitation facility includes a surface assembly notably floating and a bottom assembly (not shown) which are generally connected with each other through the flexible pipe 10.

The flexible pipe 10 is preferably an «unbonded» pipe.

At least two adjacent layers of the flexible pipe 10 are free to move longitudinally with respect to each other during flexure of the pipe.

Advantageously, all the layers of the flexible pipe are free to move relatively to each other. Such a pipe is for example described in the normative documents published by the American Petroleum Institute (API), API 17J, and API RP17B.

As illustrated by FIG. 1, the pipe 10 delimits a plurality of concentric layers around the axis A-A', which continuously extend along the central segment 12 as far as the endpieces 14 located at the ends of the pipe.

According to the invention, the pipe 10 includes at least one first tubular sheath 20 based on a polymeric material advantageously forming a pressure sheath.

The pipe 10 further includes at least one layer of tensile armors 24, 25 externally positioned with respect to the first sheath 20.

Advantageously, and depending on the desired use, the pipe 10 further includes an internal carcass 26 positioned inside the pressure sheath 20, a pressure vault 28 inserted between the pressure sheath 20 and the layer(s) of tensile armors 24, 25 and an external sheath 30, intended for protecting the pipe 10.

In a known way, the pressure sheath 20 is intended to sealably confine the fluid conveyed in the passage 16. It is formed in a polymeric material, for example based on polyolefin such as polyethylene, based on polyamide such as PA11 or PA12, or on the basis of a fluorinated polymer such as polyvinylidene fluoride (PVDF).

The thickness of the pressure sheath 20 is for example comprised between 5 mm and 20 mm.

The carcass 26, when it is present, is for example formed with a profiled metal sheet wound as a spiral. The turns of the sheet are advantageously interlocked with each other, which gives the possibility of absorbing the squeezing radial forces.

In this example, the carcass 26 is positioned inside the pressure sheath 20. The pipe is then designated by the term of «rough bore» because of the geometry of the carcass 26

Alternatively (not shown), the flexible pipe 10 is without any internal carcass 26, it is then designated by the term of «smooth bore».

The helical winding of the profiled metal sheet forming the carcass 26 is with a short pitch, i.e. it has a helix angle with an absolute value close to 90°, typically comprised between 75° and 90°.

In this example, the pressure vault 28 is intended to absorb the forces related to the pressure prevailing inside the pressure sheath 20. For example it is formed with a metal profiled wire helically wound around the sheath 20. The profiled wire generally has a complex geometry, notably with the shape of a Z, T, U, K, X or I.

The pressure vault 28 is helically wound with a short pitch around the pressure sheath 20, i.e. with a helix angle with an absolute value close to 90°, typically comprised between 75° and 90°.

The flexible pipe 10 according to the invention comprises at least one layer of armors 24, 25 formed with a helical winding of at least one elongated armor element 29.

In the example illustrated in FIG. 1, the flexible pipe 10 includes a plurality of armor layers 24, 25 notably an inner armor layer 24, applied on the pressure vault 28 (or on the sheath 20 when la vault 28 is absent) and an outer armor layer 25 around which is positioned the outer sheath 30.

Each layer of armors 24, 25 includes longitudinal armor elements 29 wound with a long pitch around the axis A-A' of the pipe.

By «wound with a pitch», is meant that the absolute value of the helix angle is less than 60°, and is typically comprised between 25° and 55°.

The armor elements 29 of a first layer 24 are generally wound according to an opposite angle with respect to the armor elements 29 of a second layer 25. Thus, if the winding angle of the armor elements 29 of the first layer 24 is equal to +α, α being comprised between 25° and 55°, the winding angle of the armor elements 29 of the second layer of armors 25 positioned in contact with the first armor layer 24 is for example equal to −α°.

The armor elements 29 are for example formed with metal wires, notably steel wires, or with ribbons in a composite material, for example ribbons reinforced with carbon fibers. In the examples illustrated in FIGS. 2 to 5, the armor elements 29 are formed with metal wires.

As this will be seen below, the armor elements 29 each have an end segment 34 introduced into the endpiece 14. The end segment 34 extends as far as a free end positioned in the endpiece 14. It advantageously has a pseudo-helical trajectory with an axis A-A' in the endpiece 14, the helix being wound on a conical envelope.

Figure 3:
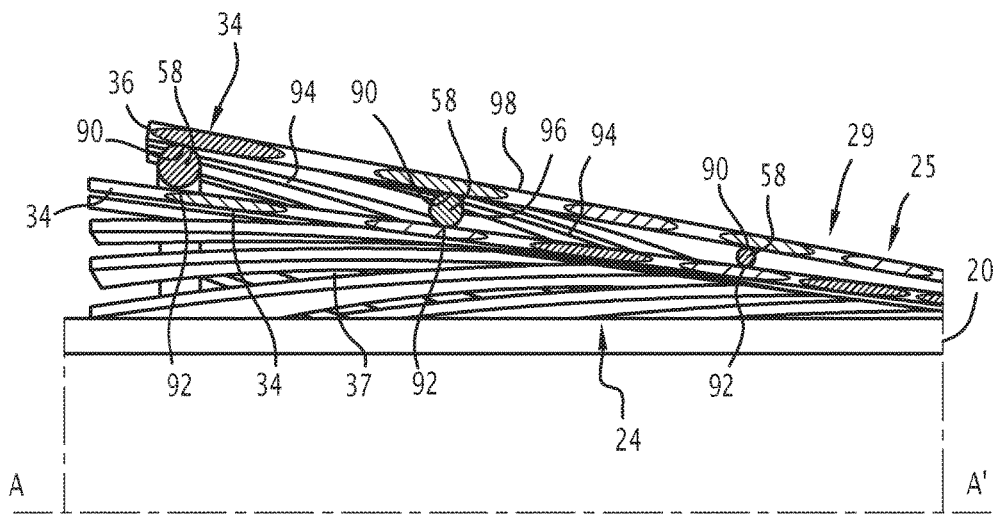
FIG. 3 is a view of a detail, taken as a section along a median axial plane, of the armor layers in the endpiece of FIG. 2.

In the example illustrated in FIGS. 2 and 3, for each armor layer 24, 25, the end segments 34 of the armor elements 29 extend in a divergent way away from the axis A-A', from a rear detachment point 35 to a free front end 36.

The end segments 34 of the armor elements 29 thus delimit an envelope with a substantially frustoconical shape of axis A-A' opening towards the front. They thus form an end tulip.

Figure 4:
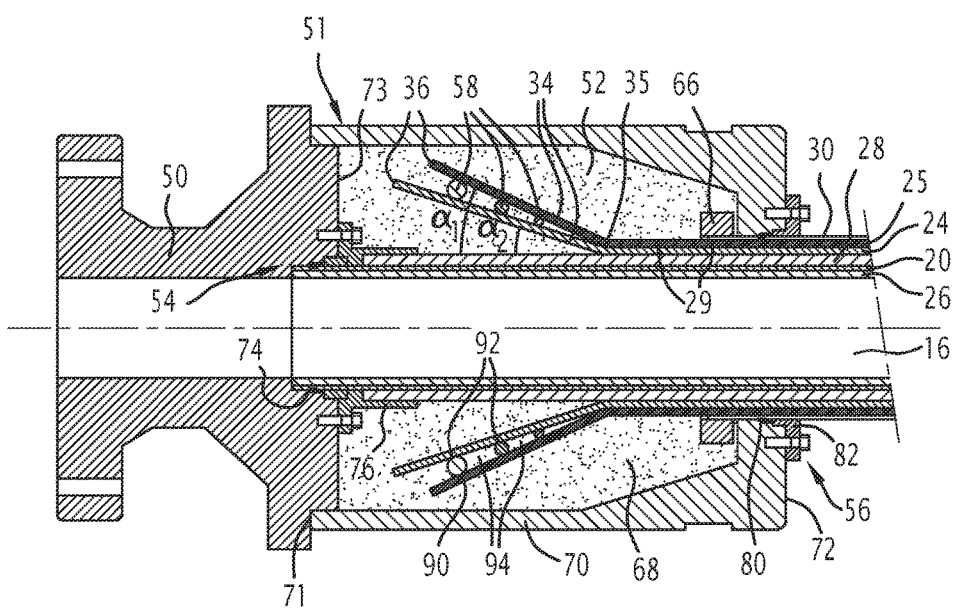
FIG. 4 is a partial view taken as a section along a median axial plane, of the endpiece of the first flexible pipe according to the invention.

As illustrated in FIG. 4, the angle α1 of the opening of the end segments 34 of the armor elements 29 of the outer armor layer 25 is greater than the opening angle α2 of the end segments 34 of the armor elements 29 of the inner armor layer 24.

Further, for each layer of armors 24, 25, the end segments 34 are laterally moved away from each other. In particular, the side edges of each pair of end segments 34 facing each other delimit between them circumferential interstices 37, visible in FIG. 2.

In this example, the circumferential interstices 37 extend between the rear detachment points 35 and the free front ends 36. They have a circumferential width which increases from the rear to the front.

Advantageously, and as this will be seen below, the end segments 34 are positioned during the manufacturing of the endpiece 10 in order to have their conformation as close as possible to their natural conformation, in which they are less stressed. This conformation is obtained by allowing the end segments 34 of each layer 24, 25 be freely released, which allows them to adopt a divergent configuration, with the shape of a tulip.

The external sheath 30 is intended to prevent permeation of fluid from the outside of the flexible pipe 10 towards the inside. It is advantageously made in a polymeric material, notably based on a polyolefin, such as polyethylene, based on a polyamide, such as PA11 or PA12, or based on a fluorinated polymer such as polyvinylidene fluoride (PVDF).

The thickness of the external sheath 30 is for example comprised between 5 mm and 15 mm.

As illustrated by FIG. 2, in addition to the end segments 34, each endpiece 14 includes an end vault 50 and an outer connecting cover 51 protruding axially towards the rear from the vault 50. The cover 51 delimits, with the end vault 50, a chamber 52 for receiving the end segments 34 of the armor elements 29.

The endpiece 14 further includes a front sealing assembly 54 around the tubular sheath 20, schematically illustrated in FIG. 2, and a rear sealing assembly 56 around the outer sheath 30.

According to the invention, the endpiece 14 further includes at least one spacing member 58 positioned so as to internally bear upon the end segments 34 of the armor elements 29 of at least one layer of armors 24, 25.

In the example illustrated in FIG. 4, each spacing member 58 is positioned so as to externally bear upon the end segments 34 of the armor elements 29 of the inner armor layer 24, and internally bearing upon the end segments 34 of the armor elements 29 of the outer armor layer 25.

Although this is not illustrated in FIG. 4, it is also possible to position one or several spacing members internally bearing upon the end segments 34 of the armor elements 29 of the inner armor layer 24.

The endpiece 14 further comprises advantageously a rear member 66 for maintaining the armor layers 24, 25 located in the rear area of the endpiece 14, and a solid filling material 68 positioned in the chamber 52 in order to embed the end segments 34 and the spacing members 58.

In this example, the end vault 50 is intended to connect the pipe 10 to another connection endpiece 14 or to pieces of terminal equipment, advantageously via an end flange (not shown).

The end vault 50 has a central bore intended to receive the end of the pressure sheath 20 and to allow flow of the fluid circulating through the central passage 16 towards the outside of the pipe 10.

The cover 51 includes a tubular peripheral wall 70 extending around the axis A-A'. The peripheral wall 70 has a front edge 71 attached on the end vault 50, radially away from the layers of armors 24, 25 and a rear edge 72 extending axially towards the rear beyond the end vault 50.

The cover 51 delimits the chamber 52 radially outwards. A rear face 73 of the end vault 50 axially delimits the chamber 52 towards the front.

The front sealing assembly 54 is advantageously located at the front of the endpiece 14, in contact with the vault 50. In the embodiment of FIG. 2, the front sealing assembly 54 is axially shifted towards the front with respect to each spacing member 58.

In a known way, it includes a front crimping ring 74, intended to engage on the pressure sheath 20, and a crimping flange 76. The tightening of the flange 76 against the vault 50 has the effect of radially deforming the front crimping ring 74 so that the latter will engage on the pressure sheath 20. In the example illustrated in FIG. 2, in which the pipe 10 includes a pressure vault 28, the front assembly 54 further includes an intermediate stopping ring (not shown) of the pressure vault 28. The intermediate stopping ring is interposed between the front crimping ring 74 and the crimping flange 76.

The sealing rear assembly 56 is positioned behind the rear spacing member 66.

It includes at least one rear crimping ring 80 crimping the external sheath 30, and a rear crimping-clamping flange 82 of the rear ring 80, attached on the cover 51, advantageously at the rear edge 72 of the peripheral wall 70.

In the example illustrated in FIGS. 3 and 4, the endpiece 14 includes a plurality of disconnected spacing members 58, axially spaced apart from each other along the axis A-A', interposed between the end segments 34 facing the armor elements 29 of the armor layers 24, 25.

Each spacing member 58 is totally contained in the chamber 52.

Each spacing member 58 is formed here with a continuous ring with a central axis A-A'. In this example, the ring has a circular cross section, which alternatively, may be elliptical or polygonal, notably in the shape of a quadrilateral for example a trapezium, a parallelogram, a rectangle, a rhombus, a square, or further a triangle, a pentagon or a hexagon.

Each spacing member 58 is advantageously made in a non-metal material, for example a plastic material of the polyamide type (nylon), of the elastomeric, rubber or further resin type.

Further, this non-metal material advantageously has a hardness greater than or equal to 80 shore A and preferentially greater than or equal to 50 shore D. When the selected material is a rubber or an elastomer, such hardness notably prevents a spacing member 58 from deforming and being excessively crushed in contact with the armor layers 24, 25.

As illustrated by FIG. 3, the spacing members 58 define, on each end segment 34, contact areas 90, 92 axially spaced apart along the axis A-A' in the median axial plane of FIG. 3.

The axial spacing between two successive contact areas 90, 92 along the axis A-A', is greater, notably at least twice greater than the maximum axial extent of the spacing member 58, taking along the axis A-A' facing the contact area 90, 92.

Each spacing member 58 has an upper contact area 90 with an end segment 34 of a armor element 29 of the outer armor layer 25, and a low contact area 92 with an end segment 34 of a armor element 29 of the inner armor layer 24.

The successive contact areas 90, 92 of the spacing members 58 with each end segment 34, spaced apart axially along the end segment, defined between them intermediate contact spaces 94 between the filling material 68 and the end segments 34.

Each intermediate space 94 is delimited in the front and in the rear by a spacing member 58. It opens towards the inside and towards the outside between the spacing members 58. It opens towards the outside and towards the inside in the circumferential interstices 37 defined between each pair of end segments 34 of a armor layer 24, 25.

Thus, the filling material 68 is able to penetrate into each intermediate space 94 through the circumferential interstices 37 in order to directly come into contact with the end segment 34, between the successive contact areas 90, 92.

This significantly increases the contact surface area between the filling material 68 and each end segment 34, which increases the adhesion between the filling material 68 and each end segment 34. The axial tensile strength of the endpiece 14 is thus strongly improved.

Further, the presence of the spacing members 58 during the mounting of the endpiece 14 gives the possibility of reducing the risk of scratching the end segments 34 by making them rub against each other.

Moreover, the maximum radial thickness of each spacing member 58, taken relatively to the axis A-A', is generally less than 5 times the maximum radial thickness of the end segment 34, taken in the contact area 90, 92.

This provides a maximum radial gap between the end segments 34 of the armor layers 24, 25 advantageously greater than 3 mm, notably greater than 5 mm, and preferably greater than 10 mm.

This maximum radial gap is generally less than 30 mm, preferably less than 20 mm.

The thickness of the filling material 68 present in the intermediate space 94 is thus controlled and limited, which promotes its mechanical strength.

In the example illustrated by FIG. 3, the maximum radial thickness of each spacing member 58 decreases from the front towards the rear. Thus, the spacing member 58 located the more in the front has a maximum radial thickness greater than that of the spacing member 58 located the more in the rear. This retains the natural shape of the end segments 34 of each armor layer 24, 25.

Further, the presence of the spacing members 58 limits, or even suppresses the contacts between the armor elements 29 of the armor layers 24, 25 in the endpiece 14, which increases the fatigue strength.

With reference to FIG. 2, the rear maintaining member 66 is positioned around armor elements 29 of the armor layer 25, at the rear portion of the endpiece 14.

At the location of the rear maintaining member 66, the armor elements 29 of the armor layers 24, 25 are helically wound with the same helix radius as the one they have at the central segment 12.

The rear maintaining member 66 appears as a ring-shaped collar, and does not contribute significantly to absorption of the tensile forces. Its function is notably to prevent disorganization of the armor layers 24, 25 during the mounting of the endpiece 14, as this will be discussed further on.

The solid filling material 68, such as a thermosetting polymeric resin of the epoxy type is positioned in the chamber 52 around the rear maintaining member 66, of the vault 50, and the end segments 34 of the armor elements 29.

The material 68 substantially fills totally the chamber 52. Preferably it is injected in a fluid way into the chamber 52 and solidifies in the latter, by binding the end segments 34 of the armor elements 29 to the vault 50 and/or to the cover 51.

As indicated above, the filling material 68 fills the circumferential interstices 37 between the adjacent end segments 34 of the armor elements 29 of each armor layer 24, 25, as well as the intermediate spaces 94 defined between the contact areas 90, 92 of each spacing member 58, between two armor layers 24, 25.

Thus, with reference to FIG. 3, each end segment 34 of a armor element 29 has an inner face 96 and an outer area 98 which are both in contact with the filling material 68.

The filling material 68 completely surrounds each end segment 34 over the whole perimeter of the latter, on each longitudinal portion between two successive contact areas 90, 92 along the axis A-A'.

The presence of a contact between the filling material 68 and the armor element 29 at the level of at least one portion of the end segments 34, on either side of the armor element 29 ensures highly effective absorption of the tensile forces. This allows a decrease in the anchoring length.

As an example, for a shear strength of 2 MPa at the interface between the armor element 29 and the filling material 68, a armor element 29 with the perimeter equal to about 30 mm and with the length of 500 mm is able to absorb a tensile force of about 30 kN. For a web of 31 wires, this represents an absorbed tension of about 1,000 kN for an endpiece 14 according to the invention, while this absorbed tension is reduced to 500 kN if the end segment 34 does not have a longitudinal portion totally in contact with the filling material 68.

The assembling of the endpiece 14 according to the invention is achieved in the following way.

Initially, the different layers of the pipe 10 are cut to the right length in order to show, on the vault 28, a free end segment 34 of each armor element 29 of the armor layers 24, 25.

Each free end segment 34 is initially without any radial deformation, notably any wave or hook-shaped deformation.

And then, the rear maintaining member 66 in an expanded configuration is mounted around the armor layer 25, before being clamped around the latter.

And then, the end segments 34 of each armor layer 24, 25 are left free to adopt a stable conformation, without any external stress.

Advantageously, the end segments 34 of the armor elements 29 of the armor layers 24, 25 open out towards the front for exhibiting a divergent shape away from the A-A' axis forwards.

Moreover, circumferential interstices 37 appear between the adjacent end segments 34.

The end segments 34 of the armor elements 29 of the outer armor layer 25 are then slightly lifted away from the axis A-A', advantageously without folding them backwards, in order to successively introduce the spacing members 58, by placing them so as to bear upon the outside of the end segments 34 of the armor elements 29 of the inner armor layer 24. This step is advantageously conducted without plastically or irreversibly deforming the end segments 34 of the armor elements 29, i.e. by being limited to elastic deformations, which avoids weakening the material and degrading its fatigue strength.

And then, the end segments 34 of the armor elements 29 of the outer armor layer 25 are laid down again while internally bearing upon the spacing members 58.

In an alternative (not shown), spacing members 58 are also introduced similarly bearing upon the inside of the end segments 34 of the armor elements 29 of the inner armor layer 24.

The method for introducing these spacing members 58 first consists of slightly lifting the end segments 34 of the armor elements 29 away from the axis A-A', secondly successively introducing the spacing members 58 by placing them so as to bear upon the outer face of the underlying layer, for example on the outer face of the pressure vault 28, and thirdly folding the end segments 34 of the armor elements 29 back towards the axis A-A', so that the latter will rest by internally bearing upon the spacing members 58.

As indicated earlier, the spacing members 58 define, on each end segment 34, contact areas 90, 92 with the spacing member 58 spaced apart axially from each other.

The spacing members 58 delimit, between the contact areas 90, 92, intermediate spaces 94 which open towards the inside and towards the outside in interstices 37.

Next, the vault 50 and the sealing front assembly 54 are set into place. The cover 51 is then set into place and is attached to the vault 50.

The rear sealing assembly 56 is then set into place and is attached to the cover 51.

Finally, the filling material 68 is introduced into the chamber 52, advantageously as a fluid.

Advantageously, the endpiece 14 is placed vertically. The material 68 fills the chamber 52 from bottom to top and solidifies between the vault 50 and the cover 51 around end segments 34 of the armor elements 29.

In particular, the filling material 68 successively penetrates into the interstices 37 made between the end segments 34 of the armor elements 29 of the outer armor layer 25, in the intermediate spaces 94 defined between the spacing members 58, and in the interstices 37 made between the end segments 34 of the armor elements 29 of the inner armor layer 24.

The end segments 34 are thereby embedded into the filling material 68, with a maximum contact surface area with this filling material 68, towards the inside as towards the outside.

During operation, when the endpiece 14 is connected to another endpiece or to a surface assembly, the axial tension transmitted by the armor layers 24, 25 resulting from the weight of the pipe 10 is absorbed by the segments 34 embedded in the filling material 68, notably by the presence of the spacing members 58 delimiting intermediate spaces 94 filled with filling material 68 which are in direct contact with the armor elements 29.

In an alternative (not shown), collars are applied around the end segments 34 of the armor elements 29 of the outer armor layer 25 in order to limit the outer diameter of the latter, and to obtain a reproducible geometry at the anchoring area. These collars may notably avoid that the end segments 34 of the armor elements 29 may be in contact with the cover 51.

In an alternative (not shown), the spacing members 58 consist of an identical material with that of the filling material 68 so that they then merge with the filling material 68 in order to form a continuum, which gives the possibility of avoiding generation of stress concentrations in the filling material 68 in the vicinity of the spacing members 58.

In an alternative (not shown), the endpiece 14 includes a continuous spacing member 58 delimiting a plurality of turns.

The spacing member 58 is for example helically wound. It is then advantageously formed with a flexible profile, for example a rubber ring notably of the type of those used for making seal O-ring gaskets. It may also consist of a string or a braid with a square, rectangular or round section, said string or braid for example consisting of an assembly of glass fibers, polyester or aramide fibers (Kevlar®). The thickness of this spacing member 58 is advantageously comprised between 3 mm and 20 mm, preferentially comprised between 5 mm and 15 mm.

Each turn delimits, along each end segment 34, a succession of contact areas 90, 92 with each end segment 34. The successive turns delimit between the contact areas 90, 92 intermediate spaces 94, wherein the filling material 68 is able to be applied on the end segment 34.

The successive turns are not in axial contact with each other. The intermediate spaces open towards the inside and towards the outside.

Such a spacing member 58 promotes filling of the material 68 in the intermediate spaces 94, the material being able to more easily flow by moving along the helix defined by the spacing member 58 from the free front end 36 of the end segments 34.

The helix angle of the turns of the spacing member 58 is in this case, advantageously greater than the helix angle of the end segments 34. Preferably it is less than 70°.

In the case when the helix angle of the end segments 34 is less than or equal to 35°, the helix angle of the spacing member 58 is for example comprised between 40° and 70°.

Figure 5:
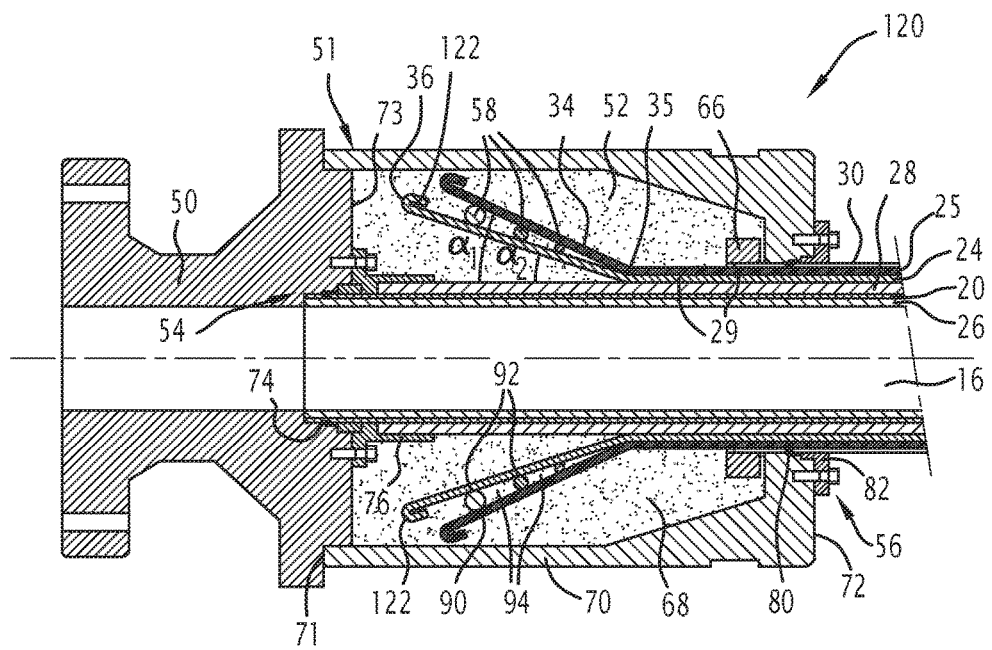
FIG. 5 is a similar view to FIG. 4 of the endpiece of a second flexible pipe according to the invention.

The endpiece 14 of a second flexible pipe 120 according to the invention is illustrated by FIG. 5. Unlike the endpiece 14 illustrated in FIG. 4, an additional anchoring portion 122 is provided at the free front ends 36 of each end segment 34.

In the example of FIG. 5, the anchoring portion 122 is a deformation, notably with the shape of a hook folded back towards the rear. Alternatively, the deformation 122 has the shape of a wave or ripple, of a twist or further of a local increase in the cross-section of the end segment 34.

Figure 6:
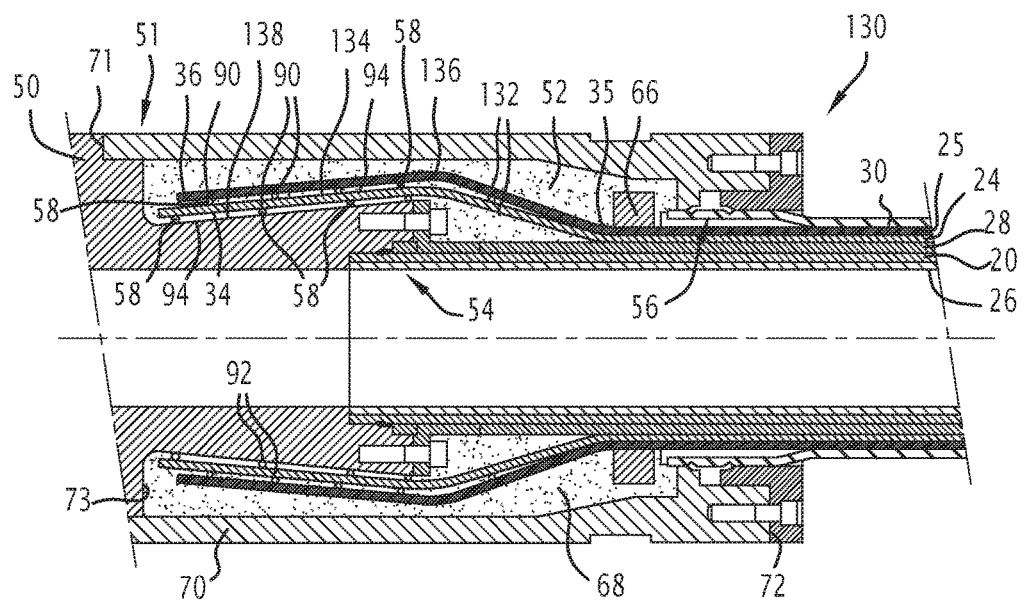
FIG. 6 is a similar view to FIG. 4 of the endpiece of a third flexible pipe according to the invention.
Figure 7:
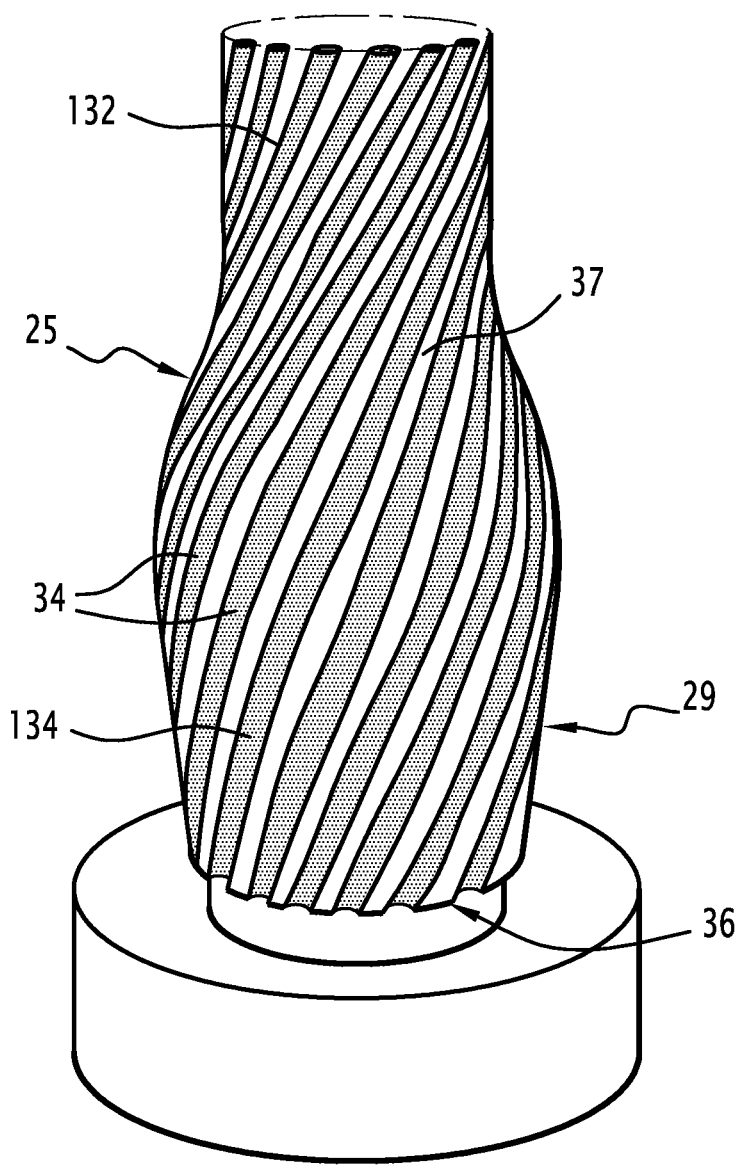
FIG. 7 is a side view of the end segments of the armor elements, in the endpiece of FIG. 6.

The endpiece 14 of a third flexible pipe 130 according to the invention is illustrated by FIGS. 6 and 7.

Unlike the endpiece 14 illustrated in FIG. 4, each end segment 34 of a armor element 29 has a rear region 132 which diverges away from the axis A-A' from the rear to the front, and a front region 134 which converges towards the axis A-A' from the rear to the front.

The rear region 132 extends forwards from a rear detachment point 35 as far as an inflection point 136 delimiting the front region 134.

The front region 134 extends forwards from the inflection point 136 as far as the free front end 36.

The end vault 50 has a rear supporting surface 138 here converging towards the axis A-A' from the rear to the front. The front region 134 is positioned facing the supporting surface 138.

The rear surface 138 has a maximum transverse extent greater than the maximum transverse extent of the tubular sheath 20 and than the maximum transverse extent of the pressure vault 28, when it is present.

The sealing front assembly 54 is internally located under the end segments 34.

In the example illustrated in FIG. 6, the endpiece 14 includes at least one inner spacing member 58 interposed between the supporting surface 138 and the end segments 34 of the armor elements 29 of the inner armor layer 24, and at least one outer spacing member 58 positioned between the end segments 34 of the armor elements 29 of the inner armor layer 24 and of the outer armor layer 25.

In this example, the inner spacing member 58 is wound around the supporting surface 138 in order to exhibit successive turns.

The turns define several contact regions 90 between each end segment 34 of the armor elements 29 of the inner armor layer 24, inside the end segment 34.

Also, the outer spacing member 58 is wound around each end segment 34 of the armor elements 29 of the inner armor layer 24 in order to exhibit successive turns.

The turns define several contact regions 90 with each end segment 34 of the armor elements 29 of the outer armor layer 25, and several contact regions 92 with each end segment 34 of the armor elements 29 of the inner armor layer 24.

For each end segment 34, the contact regions 90, 92 are axially spaced apart from each other along the axis A-A'.

As earlier, the contact regions 90, 92 define between them intermediate spaces 94, where the filling material 68 penetrates and comes into contact with the end segment 34 on the whole perimeter of the segment of the end 34.

In this example, the contact regions 90 between each end segment 34 of a armor element 29 of the outer armor layer 25 and the outer spacing member 58 are located in the front region 134 and in the rear region 132.

The contact regions 90 between each end segment 34 of a armor element 29 of the inner armor layer 24 and the inner spacing member 58 are only located in the front region 134 of the end segment 34.

The endpiece 14 described in FIGS. 6 and 7 is particularly suitable for armor elements 29 in composite material, notably formed with ribbons in composite material.

These armor elements 29 generally include a matrix in plastic material, notably in a thermosetting material for example in epoxy or a thermoplastic (for example in polyamide 11, polyamide 12, polyamide 6-12, in polyvinylidene fluoride (PVDF), in polysulfide such as phenylene polysulfide (PPS), or in a polymer of the ketone type like poly ether-ether-ketone (PEEK)), on the one hand and of armor fibers, notably glass, carbon, basalt, aromatic polyester (Vectran®) or aramide (Kevlar®, Twaron®, Technora®) fibers along a same direction on the other hand.

Examples of armor elements 29 of this type are described in WO99/49259, US2009/000683, WO00/66927, WO02/095281, or in the Thesis «Material characterization and life prediction of a carbon fiber/thermoplastic matrix composite for use in non-bonded flexible risers», by Blair Edward Russell, Faculty of the Virginia Polytechnic Institute and State University, Dec. 12, 2000.

The thereby obtained flexible pipe 130 has a relatively low mass and may be used at great depth, while guaranteeing adequate anchoring of the composite armor elements 29.

Alternatively, the endpiece 14 described in FIGS. 6 and 7 include metal armor elements 29, as described earlier.

In another alternative of the embodiment of FIGS. 6 and 7, the endpiece 14 includes a plurality of disconnected spacing members 58, spaced apart axially from each other, in order to define successive contact areas 90, 92, as described earlier.

More generally, in an alternative, in order to improve the adhesion between the end segments 34 and the filling material 68, degreasing of the end segments 34 is carried out before placing the filling material 68 in the chamber 52. It is also advantageous to apply a primary adhesion coating, for example with a brush, as this is described in French application FR 13 53698 of the Applicant.

Figure 8:
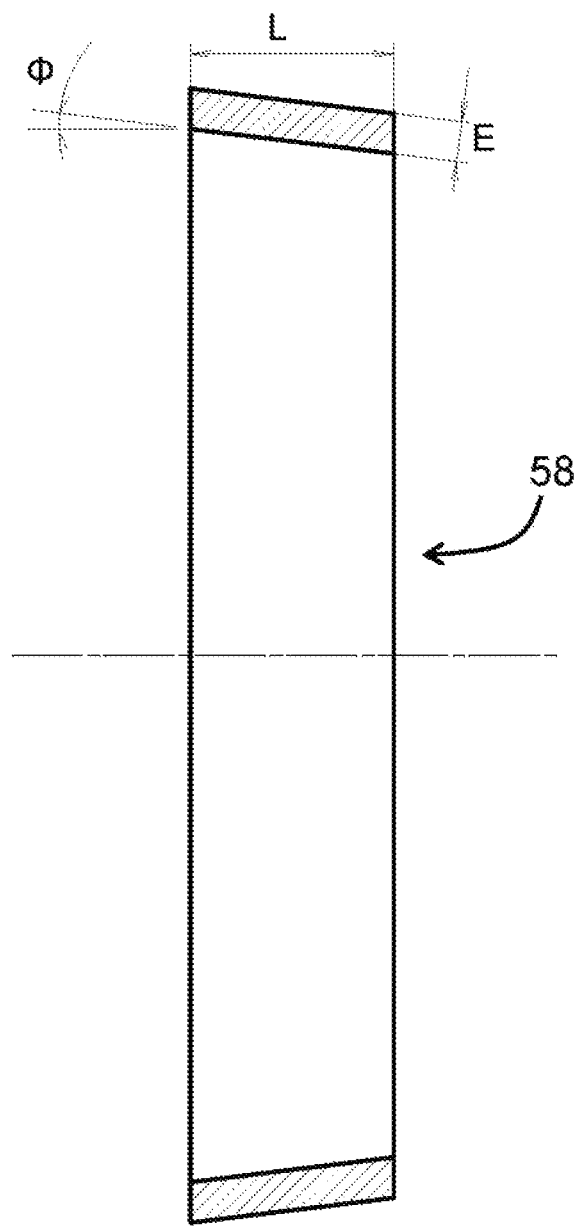
FIG. 8 is a sectional view of a spacing member according to one of the embodiments of the invention.

FIG. 8 illustrates a particular embodiment of a spacing member 58 which may be used for applying the present invention.

This spacing member 58 appears as a continuous ring with a central axis A-A'. The internal face of this ring is a first cone segment of axis A-A' and with a half-angle at the apex $\phi$. The external face of this ring is a second cone segment parallel to the first cone segment (same axis and same half-angle at the apex).

The two side faces of this ring are included in planes perpendicular to the A-A' axis. In this way, this ring has a cross-section having the shape of a parallelogram, for which both small faces are perpendicular to the A-A' axis and for which both large faces are tilted by an angle $\phi$ with the axis A-A'.

The conical geometry of the internal and external faces of this spacing member 58 gives the possibility of fitting the substantially frusto-conical shape of the end segments 34 of the armor elements 29 when they form an end tulip. This has the effect of the facilitating the setting into place of the spacing members 58 and of improving their stability during the mounting of the endpiece.

The angle $\phi$ is advantageously comprised between 5° and 15°. These spacing members are advantageously made in nylon. Their thickness E is advantageously of the order of 4 mm and their width L of the order of 20 mm.

What is claimed is:

1. A connection endpiece of a flexible pipe for conveying a fluid, the flexible pipe comprising at least one tubular sheath and at least one layer of tensile armors positioned externally with respect to the tubular sheath, the armor layer comprising a plurality of wire-shaped armor elements, the endpiece including:
   at least one end segment of each armor element,
   an end vault and a cover attached on the end vault, the end vault and the cover delimiting between them a chamber for receiving the at least one end segment;
   a material for filling the receiving chamber, in which the at least one end segment is embedded;
   at least one spacing member positioned so as to internally bear upon the end segments of the armor elements of at least one armor layer, the at least one spacing member defining, on at least one end segment of an armor element of said armor layer, contact areas axially spaced apart along said end segment, the contact areas delimiting between them intermediate contact spaces between the filling material and the at least one end segment; and
   the endpiece includes at least one external collar radially surrounding the end segments of the outmost armor layer, the external collar preventing contact between the cover and the end segments of the outmost armor layer.

2. The endpiece according to claim 1, including, for at least one armor layer, a plurality of disconnected spacing members, axially spaced apart from each other, each spacing member having a contact area on at least one end segment of a armor element of said armor layer.

3. The endpiece according to claim 1, including, for at least one armor layer, a spacing member wound inside the armor layer, defining turns axially spaced apart from each other, each turn having a contact area on at least one end segment of a armor element of the armor layer.

4. The endpiece according to claim 1, including at least one inner armor layer, and at least one outer armor layer, at least one spacing member being positioned between the end segments of the armor elements of the inner armor layer and the end segments of the armor elements of the outer armor layer by defining, on each end segment, contact areas axially spaced apart along the end segment, the contact areas delimiting between them intermediate contact spaces between the filling material and each armor element.

5. The endpiece according to claim 1, wherein the radial thickness of a spacing member taken facing a front contact area of the spacing member with an end segment of a armor element of at least one armor layer is different, from the radial thickness of a spacing member, taken facing a rear contact area of the spacing member with the same end segment.

6. The endpiece according to claim 5, including:
for at least one armor layer, a plurality of disconnected spacing members, axially spaced apart from each other, each spacing member having a contact area on at least one end segment of a armor element of said armor layer
at least one front spacing member defining the front contact area and at least one rear spacing member disconnected from the front spacing member, the rear spacing member delimiting the rear contact area, the maximum radial thickness of the front spacing member being different from the maximum radial thickness of the rear spacing member.

7. The endpiece according to claim 1, wherein the end segments of the armor elements of at least one armor layer are laterally spaced apart from each other and define between them circumferential interstices for contact between the filling material and the armor element.

8. The endpiece according to claim 7, wherein the circumferential interstices and the intermediate spaces communicate with each other in order to define, on each end segment, at least one peripheral contact region in which the filling material is in contact with the end segment over the whole of the perimeter of the end segment.

9. The endpiece according to claim 1, wherein each end segment of the armor elements of at least one armor layer extends in a divergent way away from a longitudinal axis of the endpiece, from a rear detachment point to a free front end.

10. The endpiece according to claim 9, including at least one inner armor layer, and at least one outer armor layer, the opening angle of the end segments of the armor elements of the outer armor layer being greater than the opening angle of the end segments of the armor elements of the inner armor layer, the at least one spacing member being positioned in contact between the end segments of the armor elements of the inner armor layer and the end segments of the armor elements of the outer armor layer.

11. The endpiece according to claim 1, wherein each end segment of the armor elements of at least one armor layer includes a rear region extending in a divergent way away from a longitudinal axis of the endpiece, from a rear detachment point, and a front region extending in a convergent way towards the longitudinal axis of the endpiece from the rear region as far as a free front end.

12. The endpiece according to claim 11, wherein the armor elements are at least partly made from a composite material.

13. A flexible pipe for conveying a fluid, including:
a tubular sheath;
at least one layer of tensile armors externally positioned with respect to the tubular sheath, the at least one layer of tensile armors comprising a plurality of wire-shaped armor elements,
an endpiece mounted at the end of the tubular sheath, the end piece comprising,
at least one end segment of each armor element,
an end vault and a cover attached on the end vault, the end vault and the cover delimiting between them a chamber for receiving the at least one end segment;
a material for filling the receiving chamber, in which the at least one end segment is embedded;
at least one spacing member positioned so as to internally bear upon the end segments of the armor elements of at least one armor layer, the at least one spacing member defining, on at least one end segment of an armor element of said armor layer, contact areas axially spaced apart along said end segment, the contact areas delimiting between them intermediate contact spaces between the filling material and the at least one end segment; and
the endpiece includes at least one external collar radially surrounding the end segments of
the outmost armor layer, the external collar preventing contact between the cover and the end segments of the outmost armor layer.

14. A method for mounting an endpiece of a flexible pipe, comprising:
providing a tubular sheath;
positioning at least one layer of tensile armors outside the tubular sheath, the at least one layer of tensile armors comprising a plurality of wire-shaped armor elements, each armor element comprising an end segment;
setting into place an end vault and a cover attached on the end vault, the end vault and the cover delimiting between them a chamber for receiving the end segment;
introducing a filling material into the receiving chamber in order to embed the end segment;
before introducing the filling material, setting into place of the at least one spacing member positioned so as to internally bear upon the end segments of the armor elements of at least one armor layer, the at least one spacing member defining, on at least one end segment of a armor element of said armor layer, contact areas axially spaced apart along said end segment, the contact areas delimiting between them intermediate contact spaces between the filling material and the end segment, after introducing the filling material, the endpiece including, after mounting, at least one external collar radially surrounding the end segments of the outmost armor layer, the external collar preventing contact between the cover and the end segments of the outmost armor layer.

15. The method according to claim 14, further comprising releasing the end segments of the armor elements of at least one armor layer so as to adopt a rest conformation before setting into place the spacing member.

16. The endpiece according to claim 5, wherein the radial thickness of a spacing member taken facing a front contact area of the spacing member with an end segment of a armor element of at least one armor layer is greater than the radial thickness of a spacing member, taken facing a rear contact area of the spacing member with the same end segment.

17. The endpiece according to claim 6, wherein the maximum radial thickness of the front spacing member is greater than the maximum radial thickness of the rear spacing member.

* * * * *